Sept. 21, 1948. J. M. HIGGINS 2,449,699
TOURIST FILM GUIDE

Filed May 11, 1943 2 Sheets-Sheet 1

John M. Higgins
INVENTOR.

BY
Victor J. Evans & Co.
ATTORNEYS

WITNESSES:

Sept. 21, 1948.　　　　J. M. HIGGINS　　　　2,449,699
TOURIST FILM GUIDE
Filed May 11, 1943　　　　　　　　　　2 Sheets-Sheet 2
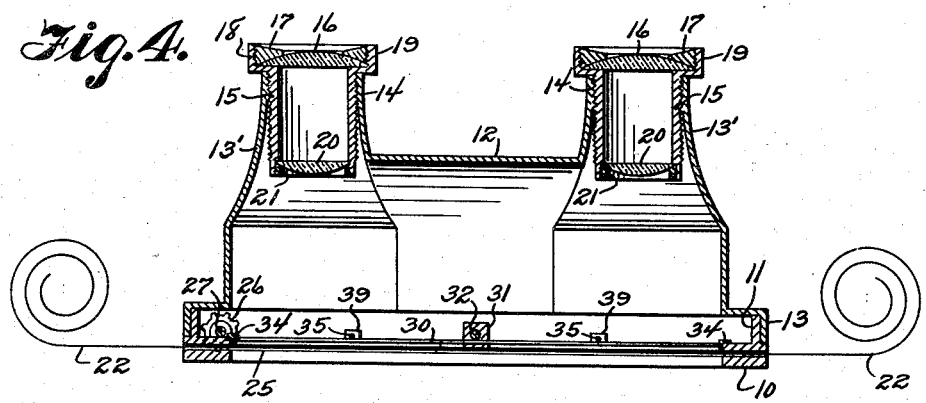
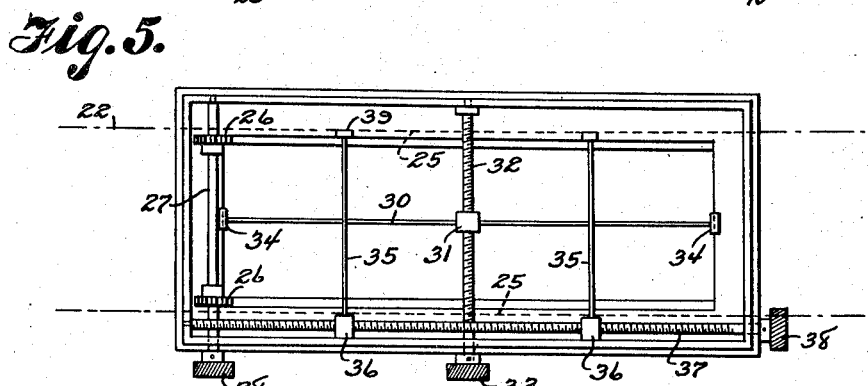
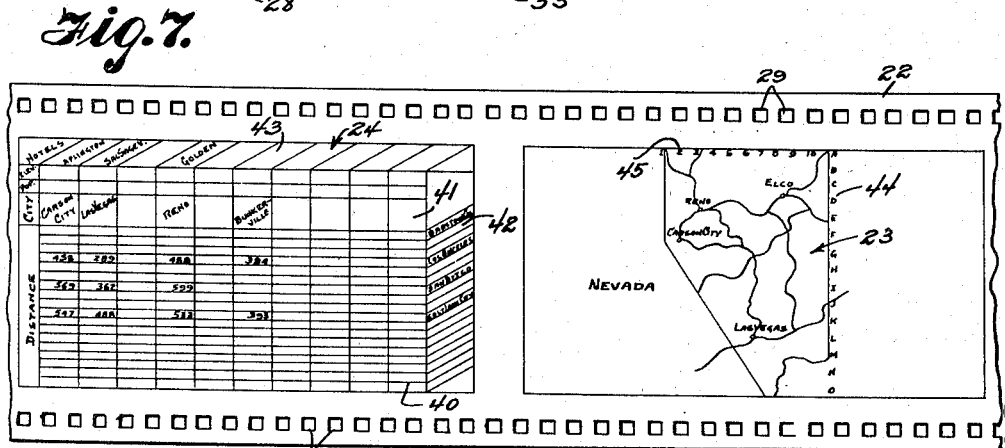
WITNESSES:　　　　　　　John M. Higgins
　　　　　　　　　　　　　　　INVENTOR.
　　　　　　　　　　BY
　　　　　　　Victor J. Evans & Co.
　　　　　　　　　　　　　ATTORNEYS Patented Sept. 21, 1948

2,449,699

UNITED STATES PATENT OFFICE 2,449,699

TOURIST FILM GUIDE

John M. Higgins, Boulder City, Nev.

Application May 11, 1943, Serial No. 486,550

1 Claim. (Cl. 40—28)

This invention relates to a tourist film guide of the type described in my pending application Changeable road map and information device, filed July 28, 1941, Serial No. 404,396, Patent No. 2,374,935, May 1, 1945, and has for an object to provide a device of this character in which road maps, and mileage and information charts are printed on a strip of moving picture film adapted to be inserted in a frame having sprocket gear means for threading the film through the casing underneath a pair of juxtaposed magnifying glasses, one of which magnifies a respective road map while the other magnifies the related chart so that information needed by tourists may be obtained with minimum effort.

A further object is to provide a device of this character adapted to carry all the road maps charts etc. that a motorist will need for a specific trip, the device being compact so as to take up little room, and being of such dimensions as to be easily manipulated to obtain the desired information.

A further object is to provide a device of this character having synchronized coordinate bars adapted to be moved respectively longitudinally and transversely of the film to indicate a desired locality on the map and simultaneously indicate pertinent information regarding that locality on the chart.

A further object is to provide apparatus of this character which will be formed of a few strong, simple and durable parts, which will be inexpensive to manufacture, and which will not easily get out of order.

With the above and other objects in view the invention consists of certain novel details of construction and combinations of parts hereinafter fully described and claimed, it being understood that various modifications may be resorted to within the scope of the appended claim without departing from the spirit or sacrificing any of the advantages of the invention.

In the accompanying drawing forming a part of this specification:

Figure 4 is a longitudinal sectional view of the film guide taken on the line 4—4 of Figure 1.

Figure 5 is a plan view of the film guide with the magnifying glasses removed to expose the coordinate bars, and adjusting means, and the film feeding sprocket means.

Figure 7 is a top plan view of a portion of the film showing a road map and the related chart thereon.

Figure 1:
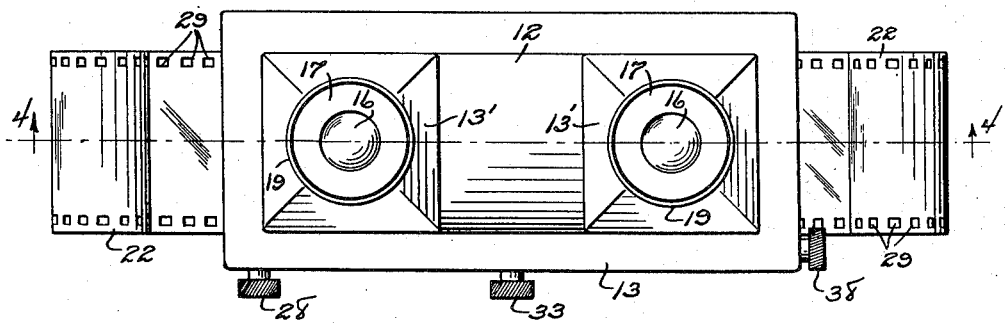
Figure 1 is a top plan view of a tourist film guide constructed in accordance with the invention.
Figure 2:
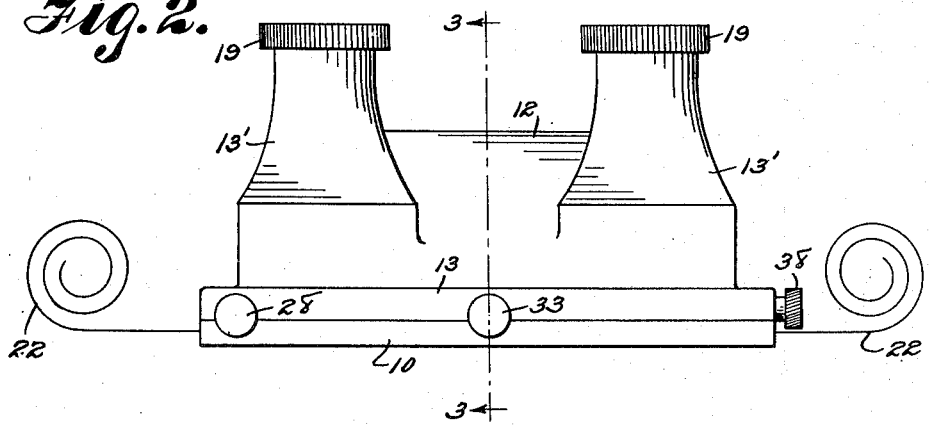
Figure 2 is a front elevation of the film guide shown in Figure 1.

Referring now to the drawing in which like characters of reference designate similar parts in the various views, 10 designates a substantially rectangular frame having a vertically disposed flange 11 on its upper side. A casing 12 is provided with an angular flange 13 adapted to fit down over the flange 11 and engage the base frame. The casing 12 is shaped to provide two cylindrical housings 13 which are exteriorly threaded at the upper end as shown at 14 to receive the exteriorly threaded barrels 15 of plano convex lenses 16 which are confined in place in their respective barrels by wedge rings 17 threadedly engaged as shown at 18 with angular rims 9 formed on the barrels. By rotating the barrels axially the magnifying lenses may be adjusted. Each barrel is equipped at the lower end with a plano concave lens 20 which is secured in position by a ring 21 threadedly engaged with the lower end of the barrel. The lenses 16 and 20 magnify images on a strip of moving picture film 22 carried by the frame 10 as will now be described.

The strip of film 22 is provided with a plurality of road maps 23 printed thereon, see Figure 7, and with a plurality of related charts 24 juxtaposed to the road maps and adapted to be viewed through the magnifying glasses heretofore described, one of the magnifying glasses magnifying the road map while the other magnifies the chart.

Figure 3:
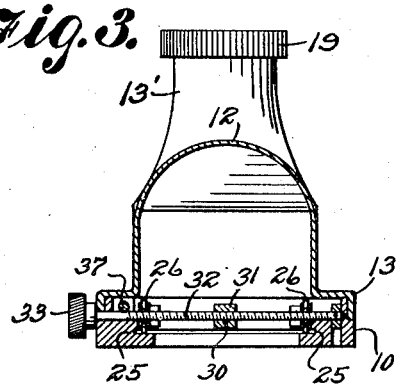
Figure 3 is a cross sectional view of the film guide taken on the line 3—3 of Figure 2.

The strip of moving picture film has the perforated edges thereof engaged in guide grooves 25 formed in the base frame 10, see Figure 3. For feeding the film in the guide grooves longitudinally of the frame a pair of sprocket wheels 26, see Figure 5, are mounted on a shaft 27 which is journaled in suitable openings in the frame. One end of the shaft projects exteriorly of the frame and is equipped with a button 28. The sprocket wheels engage in the sprocket openings 29 of the film 22 and when the button is turned the sprocket wheels feed the film longitudinally of the frame according to the direction in which the button is turned.

Figure 6:
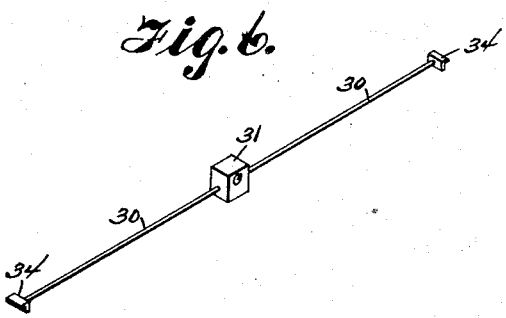
Figure 6 is a detail perspective view of one of the coordinate bars.

For easily and quickly locating desired information on both the road map and related chart a pair of coordinate bars 30 extend longitudinally of the frame and are connected at their inner ends to a traveling nut 31 which is mounted on a feed screw 32 the ends of which are journaled in suitable openings in the frame. One end of the feed screw projects exteriorly of the frame and is equipped with a button 33. The free ends of the coordinate bars 30 are equipped with angle guides 34, see Figure 6 which slideably embrace the transverse bars of the frame to guide the sliding movement of the coordinate bars as a unit transversely of both the map and the chart when the button 33 is turned to rotate the shaft and feed the traveling nut in the direction of the length of the feed screw 32.

A second pair of coordinate bars 35 are each secured at one end to a respective traveling nut 36 which is disposed on a feed screw 37. The feed screw 37 extends longitudinally along one side of the frame and is journaled in suitable openings in the frame. One end of the feed screw projects exteriorly of one of the end bars of the frame and is equipped with a button 38. The free ends of the coordinate bars 35 are provided with angular guides 39, similar to the angular guides 34 heretofore mentioned, the guides 39 riding upon one longitudinal frame bar of the frame to direct the movement of the coordinate bars 35 as a unit longitudinally of the frame and longitudinally of a respective map and chart when the button 38 is turned to advance traveling nuts 36 on the feed screw 37.

The chart 24 is provided with horizontal rows 40 containing numerals designating distances, also with vertical rows 41 bearing various names of localities such as towns and cities, also with oblique rows 42 beginning at the ends of the horizontal rows bearing designations of other localities such as towns and cities, and also with oblique rows 43 beginning at the top of the vertical rows bearing the names of various hotels.

The road map 23 is provided on one edge with index letters 44 and on an edge at a right angle thereto with index numerals 45.

The road map and the chart are synchronized in such manner that when the longitudinal and transverse coordinate bars are adjusted to intersect, as coordinates of a selected index numeral on the road map, the companion longitudinal and transverse coordinate bars will intersect at a predetermined part of the chart from which may be read the mileage, as well as the names of two localities, one of which is identical with the locality at the interseciton of the coordinate bars on the road map so that desired information necessary to motorists may be easily ascertained.

From the above description it is thought that the construction and operation of the invention will be fully understood without further explanation.

What is claimed is:

In a film viewing casing having a pair of juxtapositioned eye pieces with magnifying lenses therein and an outwardly extending base web, rectangular shape in plan with a continuous vertically disposed peripheral flange around the outer edge, the combination, which comprises, a rectangular shaped frame comprising a base with a vertically disposed peripheral flange positioned inside of the flange of the casing and having an outer recess to receive the said flange of the casing, said frame having an opening through the base thereof and a longitudinally extending slot to receive a film or the like, a transversely disposed screw extending across the frame midway between the ends thereof, a traveling nut threaded on said screw having comparatively thin bars extending at the sides parallel to the sides of the frame, said bars having guides on the ends thereof slidably mounted on opposed edges of the base at the ends of the opening therethrough, a longitudinally extending screw in one side of the frame, a plurality of traveling nuts on said longitudinally extending screw carrying comparatively thin transversely disposed bars with guides on the outer ends thereof slidable on the edge at the side of the base at the side of the opening therethrough, film actuating sprockets on a shaft transversely positioned in one end of the frame, and means manually rotating the said shaft and screws from the exterior of the frame.

JOHN M. HIGGINS.

REFERENCES CITED

The following references are of record in the file of this patent:

UNITED STATES PATENTS

| Number | Name | Date |
|---|---|---|
| 1,062,929 | Rozic | May 27, 1913 |
| 1,336,268 | Wilmot | Apr. 6, 1920 |
| 1,816,181 | Eliel | July 28, 1931 |
| 1,894,148 | Barr | Jan. 10, 1933 |
| 1,985,266 | Smith et al. | Dec. 25, 1934 |
| 2,095,084 | Rylander | Oct. 5, 1937 |
| 2,117,910 | Rossman | May 17, 1938 |
| 2,169,532 | Jensen | Aug. 15, 1939 |